United States Patent [19]

Woerner et al.

[11] Patent Number: 5,039,033
[45] Date of Patent: Aug. 13, 1991

[54] RAISABLE LANDING GEAR

[75] Inventors: Pierre Woerner, Fontenay-aux-Roses; Jean-Pierre Hainaut, La Queue-en-Brie, both of France

[73] Assignee: Messier-Bugatti, Montrouge, France

[21] Appl. No.: 538,034

[22] Filed: Jun. 13, 1990

[30] Foreign Application Priority Data

Jun. 27, 1989 [FR] France .................................. 89 08531

[51] Int. Cl.⁵ .............................................. B64C 25/12
[52] U.S. Cl. ........................... 244/102 R; 244/100 R; 244/102 SL
[58] Field of Search ....... 244/102 R, 102 SL, 102 SS, 244/100 R

[56] References Cited

U.S. PATENT DOCUMENTS 4,422,603 12/1983 Turiot et al. ..................... 244/102 R
4,917,334 4/1990 Ralph et al. ...................... 244/102 R

FOREIGN PATENT DOCUMENTS 722977 6/1942 Fed. Rep. of Germany .
2493264 5/1980 France .

Primary Examiner—Joseph F. Peters, Jr.
Assistant Examiner—Carla Mattix
Attorney, Agent, or Firm—Sixbey, Friedman, Leedom & Ferguson

[57] ABSTRACT

A retractable landing gear is arranged so as to provide, in use, a highly inclined shock absorber while avoiding high shearing stresses on the shock absorber. The landing gear includes a pivoting panel fixed to an aircraft structure to pivot about a raising axis; a shock absorber including a strut fixed to the pivoting panel so as to pivot relative thereto about a tilt axis, and a sliding rod mounted to slide in the strut and carrying a set of wheels at its bottom end; and a coupling member connected to the pivoting plate and to the bottom end of the sliding rod. Also included is a mechanism for raising and holding the landing gear.

4 Claims, 1 Drawing Sheet

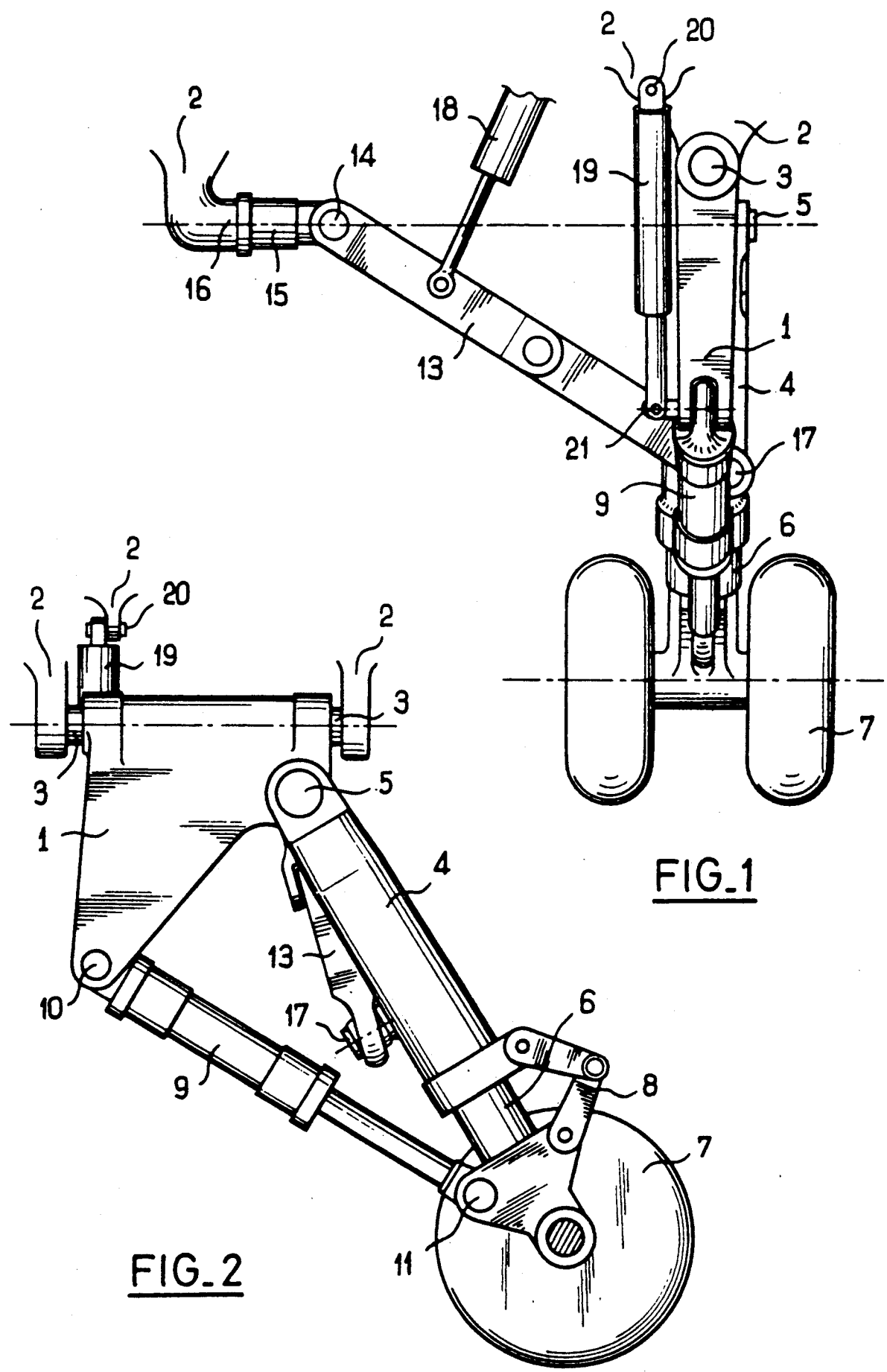

RAISABLE LANDING GEAR

The present invention relates to raisable landing gear for an aircraft.

BACKGROUND OF THE INVENTION

Landing gear is known having a direct shock absorber i.e. including a shock absorber whose strut is connected to the structure of the aircraft while the wheels are carried by its sliding rod. Landing gear with a direct shock adsorber must be vertical or at a small angle of inclination, otherwise the shear forces on the sliding rod are too great and they prevent it from sliding.

Landing gear is also known having a wheel lever and an independent shock absorber. However, the length of the wheel lever must remain limited so that lateral forces do not generate too great a twisting couple on the main strut.

In both cases outlined above, the position of the wheel set cannot be far behind the point where the landing gear is fixed to the structure of the aircraft. Prior landing gears can thus not be used when they need to be fixed to the structure of the aircraft at a considerable distance in front of the center of gravity of said structure, e.g. when the landing gear is to be fixed to the wings of the aircraft in order to be retracted therein when the center of gravity of the aircraft is substantially behind its wings.

An object of the present invention is to propose raisable landing gear capable of being used under the conditions outlined above.

SUMMARY OF THE INVENTION

To achieve this object, the present invention provides a raisable langing gear comprising a pivoting plate fitted with means for fixing to an aircraft structure so as to pivot about a raising axis; a shock absorber comprising a strut fixed to the pivoting panel so as to pivot relative thereto about a tilt axis which is substantially perpendicular to the forward travel direction of the aircraft structure, and a sliding rod mounted to slide inside the strut and carrying a set of wheels at its bottom end; coupling means having a first end hinged to the pivoting panel about an axis which is parallel to the tilt axis of the shock absorber and a second end hinged to the sliding rod in the vicinity of the set of wheels about an axis which is parallel to the tilt axis of the shock absorber; and shock absorber raising and holding means having a first end connected to the aircraft structure to pivot about a tilt axis parallel to the tilt axis of the shock absorber strut and about an axis perpendicular to said tilt axis, and a second end connected via a hinged connection to the strut of the shock absorber. Thus, even when the shock absorber is in a position which is highly inclined rearwards, the shear forces exerted by the wheel set when bearing against the ground are taken up by the coupling means and do not prevent the sliding rod sliding satisfactorily in the strut of the shock absorber.

In an advantageous embodiment of the invention, the coupling means are adjustable in length. Thus, while the landing gear is being raised, the shock absorber is brought to a substantially vertical position prior to being retracted into the structure of the aircarft, thereby reducing the longitudinal space it occupies.

According to another aspect of the invention, the tilt axis of the shock absorber strut is colinear with the tilt axis of the raising and holding means, thereby minimizing variations in the camber angle of the wheels when the shock absorber shortens.

BRIEF DESCRIPTION OF THE DRAWING

An embodiment of the invention is described by way of example with reference to the accompanying drawing, in which:

FIG. 1 is an elevation view of landing gear of the invention seen from in front; and FIG. 2 is a side elevation view of the landing gear of the invention.

DETAILED DESCRIPTION

With reference to the figures, landing gear of the invention comprises a panel 1 mounted to pivot on an aircraft structure 2 about a raising axis 3 which preferably extends parallel to the longitudinal direction of the aircraft.

The strut 4 of a shock absorber is fixed to the pivoting panel 1 so as to pivot relative thereto about a tilt axis 5 perpendicular to the pivoting panel 1 and to the forward direction of the aircraft structure. The tilt axis 5 is immediately adjacent to the raising axis 3 of the pivoting panel.

A sliding rod 6 is slidably mounted in the strut 4 and it carries a set of wheels 7 at its bottom end. In conventional manner, the sliding rod 6 is connected to the strut 4 by a scissors-like linkage 8.

A telescopic coupling actuator 9 has a first end hinged to the pivoting panel 1 about an axis 10 which is parallel to the tilt axis 5 of the shock absorber, and a second end hinged to the sliding rod 6 in the vicinity of the wheel set 7 about an axis 11 which is also parallel to the tilt axis of the shock absorber.

A foldable side brace 13 extends transversely to the pivoting panel 1 and has its top connected to the aircraft structure 2 to pivot firstly be means of a pin 15 about an axis 16 parallel to the tilt axis 5 of the shock absorber strut and preferably colinear therewith, and secondly about an axis 14 which is perpendicular to said tilt axis. The bottom end of the foldable side brace 13 is hinged to the shock absorber strut 4 via a ball joint 17.

In addition, the foldable side brace 13 is connected to a locking actuator 18. A raising actuator 19 has its top end fixed to the aircraft structure 2 to pivot about an axis 20 parallel to the raising axis 3 of the pivoting plate 1, and has a bottom end hinged to the pivoting plate 1 about an axis 21 which is also parallel to the raising axis 3 of the pivoting plate 1.

The landing gear of the invention is shown in its in-use position. In this position, the side brace 13 is locked to take up a rectilinear configuration so that the pivoting plate 1 is in a substantially vertical position. The coupling actuator 9 is extended so that the wheel set 7 is offset rearwards by a considerable distance, In this position, when the wheels engage the ground, the shear force on the sliding rod 6 is absorbed by the coupling actuator 9. After the aircraft has taken off, the coupling actuator 9 is retracted so as to bring the sliding rod 6 into a substantially vertical position, after which the locking actuator 18 of the side brace 13 is operated to take the two portions of the side brace 13 out of alignment, and finally the raising actuator 19 is operated so that the landing gear is raised, occupying space which is substantially no greater than the space occupied by conventional landing gear where the shock absorber is connected directly to the aircraft structure.

Naturally the person skilled in the art will be able to devise various other embodiments without going beyond the scope of the invention. In particular, when space permits, the coupling actuator 9 may be replaced by a rigid coupling bar, with the shock absorber remaining in an inclined position while it is being raised.

Similarly, the foldable side brace 13 may be replaced by a raising actuator or it may be associated with a single actuator which serves both to unlock it and to raise it.

We claim:

1. Raisable landing gear comprising:
 a pivoting panel fitted with means for fixing to an aircraft structure so as to pivot about a raising axis which extends substantially in a direction parallel to a longitudinal direction of the aircraft;
 a shock absorber comprising a strut fixed to the pivoting panel so as to pivot relative thereto about a tilt axis which is substantially perpendicular to the forward travel direction of the aircraft structure, and a sliding rod mounted to slide inside the strut and carrying a set of wheels at its bottom end;
 coupling means having a first end hinged to the pivoting panel about an axis which is parallel to the tilt axis of the shock absorber but separate therefrom, and a second end hinged to the sliding rod in the vicinity of the set of wheels about an axis which is parallel to the tilt axis of the shock absorber; and
 shock absorber raising and holding means having a first end connected to the aircraft structure to pivot about a tilt axis parallel to the tilt axis of the shock abosrber strut and about an axis perpendicular to said tilt axis of the shock absorber strut and a second end connected via a hinged connection to the strut of the shock absorber.

2. Raisable landing gear according to claim 1, wherein the coupling means are adjustable in length.

3. Raisable landing gear according to claim 1, wherein the tilt axis of the shock absorber strut is colinear with the tilt axis of the raising and holding means.

4. Raisable landing gear according to claim 2, wherein the tilt axis of the shock absorber strut is colinear with the tilt axis of the raising and holding means.

* * * * *